(12) United States Patent
Beall et al.

(10) Patent No.: US 9,003,632 B2
(45) Date of Patent: Apr. 14, 2015

(54) THIMBLE MECHANISM FOR RETENTION OF A SHACKLE IN A WIRE LOOP TERMINATION

(71) Applicant: The Crosby Group LLC, Tulsa, OK (US)

(72) Inventors: Roger E. Beall, Mounds, OK (US); Paul A. Boeckman, Tulsa, OK (US); Charles R. Garrett, Ramona, OK (US); Larry Postelwait, Catoosa, OK (US)

(73) Assignee: The Crosby Group LLC, Tulsa, OK (US)

(*) Notice: Subject to any disclaimer, the term of this patent is extended or adjusted under 35 U.S.C. 154(b) by 195 days.

(21) Appl. No.: 13/758,661

(22) Filed: Feb. 4, 2013

(65) Prior Publication Data

US 2014/0150240 A1    Jun. 5, 2014

Related U.S. Application Data

(60) Provisional application No. 61/607,206, filed on Mar. 6, 2012.

(51) Int. Cl.
| | | |
|---|---|---|
| *B23P 11/00* | (2006.01) | |
| *F16G 11/00* | (2006.01) | |
| *F16G 11/14* | (2006.01) | |

(52) U.S. Cl.
CPC ......... *F16G 11/146* (2013.01); *Y10T 29/49947* (2015.01); *Y10T 403/4336* (2015.01)

(58) Field of Classification Search
CPC ............ F16G 11/146; Y10T 403/4336; Y10T 29/49947; Y10T 29/49826
USPC ........... 29/525.01, 428, 433; 403/210; 294/74
See application file for complete search history.

(56) References Cited

U.S. PATENT DOCUMENTS

| | | | |
|---|---|---|---|
| 2,709,616 A | 5/1955 | Larson et al. | |
| 4,225,172 A | 9/1980 | Marquardt | |
| 5,193,480 A | * 3/1993 | Garrett ......................... | 116/200 |
| 5,553,360 A | 9/1996 | Lucas et al. | |
| 5,802,680 A | 9/1998 | Postelwait | |
| 6,035,692 A | 3/2000 | Lucas | |
| 8,256,981 B2 | 9/2012 | Lindsey | |
| 8,256,982 B2 | 9/2012 | Lindsey | |
| 2010/0050590 A1 | 3/2010 | Shnayder et al. | |
| 2012/0003033 A1 | 1/2012 | Lindsey | |

* cited by examiner

*Primary Examiner* — John C Hong
(74) *Attorney, Agent, or Firm* — Head, Johnson & Kachigian, P.C.

(57) ABSTRACT

A thimble mechanism for retention of a shackle in a wire rope loop termination. In one preferred embodiment, a thimble device is provided for a shackle having a pair of opposed legs with each leg having an end with a width smaller than a depth. The thimble device includes a thimble body having an external arcuate edge with a rope groove for receipt of a wire rope therein. A central opening extends through the thimble body with the central opening larger than the width but smaller than the depth of the shackle ends. A keyway is provided in the thimble body extending from the central opening to the arcuate edge of the thimble body.

2 Claims, 3 Drawing Sheets

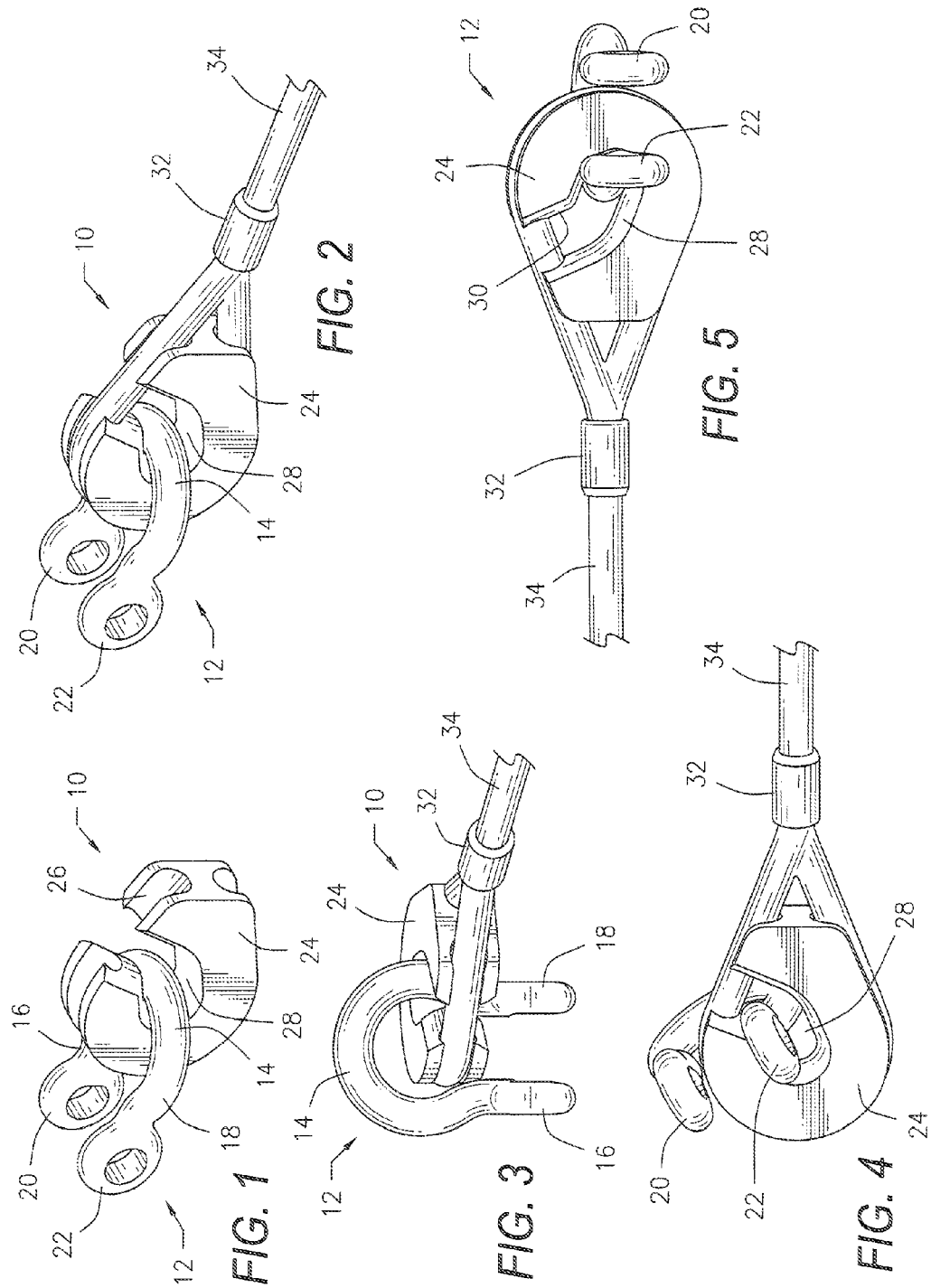

THIMBLE MECHANISM FOR RETENTION OF A SHACKLE IN A WIRE LOOP TERMINATION

CROSS-REFERENCE TO RELATED APPLICATIONS

This application claims priority to U.S. Provisional Patent Application No. 61/607,206, filed Mar. 6, 2012, which is herein incorporated by reference.

BACKGROUND OF THE INVENTION

1. Field of the Invention

The present invention relates to a thimble mechanism for retention of a shackle in a wire rope loop termination.

2. Prior Art

There are a wide variety of terminations for metal wire rope which serve to discourage fraying of the end of the wire rope and serve to permit connection to a load.

One such wire rope loop termination is accomplished in a number of manners. In one configuration, a clamp or clip is used to fix the loose end of the wire rope back to itself to form an oval or a loop. An example of a wire rope clip may be seen in Assignee's U.S. Pat. No. 5,802,680 titled "Two-Piece Bolt and Saddle for Wire Rope Clips".

In another configuration, a swage termination is formed by mechanically compressing and deforming a fitting. An example of a swage termination may be seen in Assignee's U.S. Pat. No. 6,035,692 titled "Two Pass Method and Apparatus of Forming a Hexagonal Swage for Wire Rope Terminations." Finally, an eye splice may be utilized as an alternate termination.

When there is a concern that a wire rope loop may bend too tightly under a load, a thimble may be utilized inside of the wire rope loop to preserve the shape of the loop, and to protect the wire rope from pinching and abrading on the inside of the loop. The thimble also prevents the load from coming into direct contact with the individual wires of the wire rope in order to spread the force of the load.

Various types of shackles are often used to connect a load to a wire rope loop termination. Standard shackles include a body or bow and a pair of extending legs. Each leg terminates in an ear or end to form a pair of opposed, aligned openings for receipt of a shackle bolt. When in use, the body or bow of the shackle are engaged with the wire rope loop termination.

Accordingly, it would be desirable to provide a thimble mechanism to encourage retention of the shackle in the wire rope loop termination after installation.

It would also be desirable to provide a thimble mechanism with a thimble which retains a shackle in the thimble after a wire rope is installed around the thimble.

It would also be desirable to provide a thimble mechanism for retention of a shackle in a wire rope loop termination that may be employed with any standard shackle design.

It would also be desirable to provide a thimble mechanism for retention of a shackle in a wire rope loop termination utilizing a retainer pin that locks the shackle in place and that itself is locked by the wire rope loop in the thimble.

It would also be desirable to provide a thimble mechanism which retains a shackle in a wire rope loop termination so that the shackle cannot be removed from the thimble mechanism after the wire rope is moved into place.

SUMMARY OF THE INVENTION

The present invention is directed to a thimble mechanism for retention of a shackle in a wire rope loop termination.

In one preferred embodiment, a thimble body includes an external arcuate edge with a thimble rope groove recessed therein. The thimble body includes a central opening larger than the width but smaller than the depth of shackle ends. A key way or slot is provided in the thimble body with the key way extending from the central opening to the thimble rope groove partially circumventing the thimble body.

In order to install the thimble mechanism, the bow of the shackle is inserted or reeved through the key way and into the central opening so that the bow resides in the central opening of the thimble body. The wire rope termination is thereafter completed with the wire rope reeved into place in and around the thimble rope groove. Once the wire rope loop termination has been completed, the wire rope closes the key way or slot and prevents the shackle from being removed. The angle and the width of the central opening and the key way prevent the end of the shackle from being removed from the thimble body after the wire rope is installed.

A second preferred embodiment employs a thimble body with an oval central opening and a retaining pin across the central opening.

A third preferred embodiment employs a thimble body having a thimble rope groove dimensioned so that the shackle cannot be removed from the thimble mechanism after the wire rope is reeved into place in and around the thimble rope groove.

BRIEF DESCRIPTION OF THE DRAWINGS

FIGS. 1 through 5 illustrate a first, preferred embodiment of the present invention showing sequential illustration of a thimble mechanism for retention of a shackle in a wire rope loop termination;

DETAILED DESCRIPTION OF THE PREFERRED EMBODIMENTS

Figure 6:
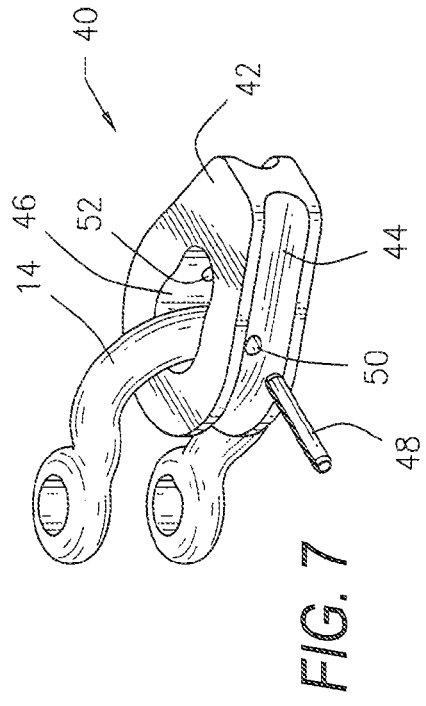
FIGS. 6 through 9 illustrate a second, preferred embodiment of the thimble mechanism for retention of a shackle in a wire rope loop termination employing a thimble with a retainer cross pin.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Referring to the drawings in detail, FIGS. 1 through 5 illustrate a first preferred embodiment 10 of the present invention showing the sequential installation of a thimble mechanism for retention of a shackle in a wire rope loop termination.

The present invention may be used with a wide variety of standard shackles. As seen in FIG. 1, the shackle 12 has a body or bow 14 and a pair of extending legs 16 and 18. Each of the legs 16 and 18 terminates in an ear or end 20 and 22, respectively. Each end 20 and 22 includes an opening to form a pair of opposed, aligned openings for receipt of a shackle bolt or screw pin. Each of the ends 20 and 22 has a width which is smaller than the depth.

A thimble body 24 includes an external arcuate edge with a thimble rope groove 26 recessed therein. The thimble rope groove 26 forms the general contour of a loop for the wire rope. The thimble body 24 includes a central opening 28. The central opening 28 is larger than the width but smaller than the depth of the shackle ends 20 and 22. Additionally, a slot or keyway 30 is provided in the thimble body 24 with the keyway 30 extending from the central opening 28 to the thimble rope groove 26 of the thimble body 24.

As seen in FIG. 1, in order to install the thimble mechanism, the bow 14 of the shackle 12 is inserted or reeved through the keyway 30 and into the central opening 28 so that the bow 14 resides in the central opening 28 of the thimble body 24.

As seen in FIG. 2, the wire rope termination 10 is thereafter completed in a variety of ways. In the embodiment shown in FIG. 2, a cylindrical sleeve 32 is initially slipped or reeved onto a wire rope 34. Thereafter, the wire rope 34 is reeved into place in and around the thimble rope groove 26. Finally, the cylindrical sleeve 32 is swaged around the wire rope 34 to complete the loop termination. Once the loop termination has been completed, the wire rope 34 closes the keyway 30 or slot and prevents the shackle 14 from being removed. As seen in FIGS. 3, 4 and 5, the angle and the width of the central opening 28 and keyway prevent the end of the shackle 12 from being removed from the thimble body 24.

FIGS. 6 through 9 illustrate a second preferred embodiment 40 of the thimble mechanism for retention of a shackle in a wire rope loop termination employing a thimble with a retainer cross pin.

As in the previous embodiment, a shackle 12 has a body or bow 14 and a pair of extending legs 16 and 18. Each of the legs 16 and 18 terminates in an ear or end 20 and 22, respectively. Each end 20 and 22 includes an opening to form a pair of opposed, aligned openings for receipt of a shackle bolt (not shown). Each of the ends 20 and 22 has a width which is smaller than the depth.

A thimble body 42 includes an external arcuate edge with a thimble rope groove 44 which circumnavigates the thimble body 42. The thimble body 42 may be seen apart from the assembly 40 in FIG. 6. The thimble rope groove 44 forms the general contour of a loop for the receipt of the wire rope. The thimble body 42 also includes a central opening 46 therethrough. The central opening is in the form of an oval which is larger than the width and the depth of the shackle ends 20 and 22, which can be best seen in FIG. 6.

Figure 7:
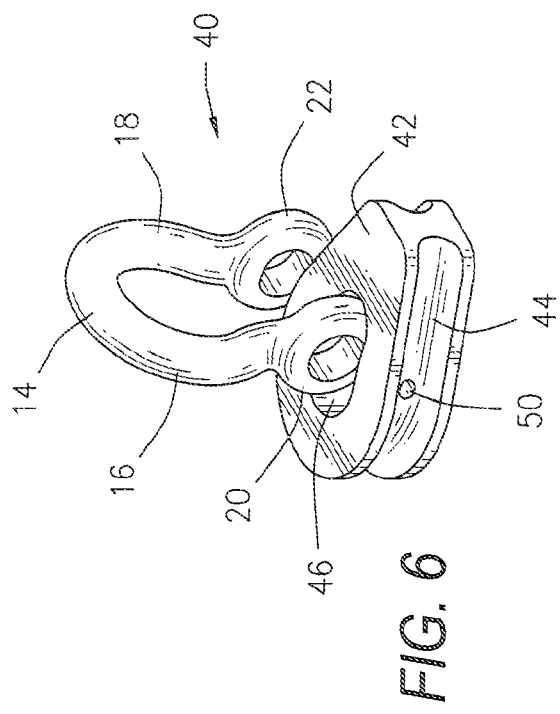

An installation sequence is illustrated in FIGS. 6 through 9. In order to install the thimble mechanism, as best seen in FIG. 6, one end of the shackle, such as end 20, is inserted or slipped through the central opening or slot 46 in the thimble body 42. Once the end 20 has been inserted into and through the central opening, the bow 14 of the shackle will reside in the central opening, as best seen in FIG. 7.

Thereafter, as seen in FIG. 7, a retaining pin 48 is inserted through a first opening 50 in the thimble body 42 into and across the central opening 46 and into an opposed, second opening 52 in the thimble body 42. The retaining pin 48 and the openings 50 and 52 may be designed so that the retaining pin 48 will friction fit within the openings. In addition, the location of the openings and the pin 48 are designed to retain the proper orientation of the shackle 12.

Figure 8:
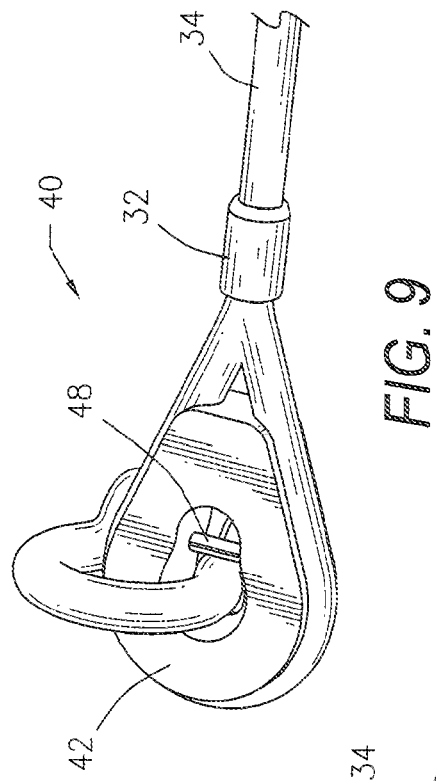

Thereafter, as seen in FIG. 8, a cylindrical sleeve 32 will be slipped over or reeved onto an end of a wire rope 34. Thereafter, the wire rope 34 will be reeved or threaded in the thimble rope groove 44 of the thimble body 42 to form a termination loop. Finally, the sleeve 32 will be swaged or otherwise connected to the wire rope 34.

Figure 9:
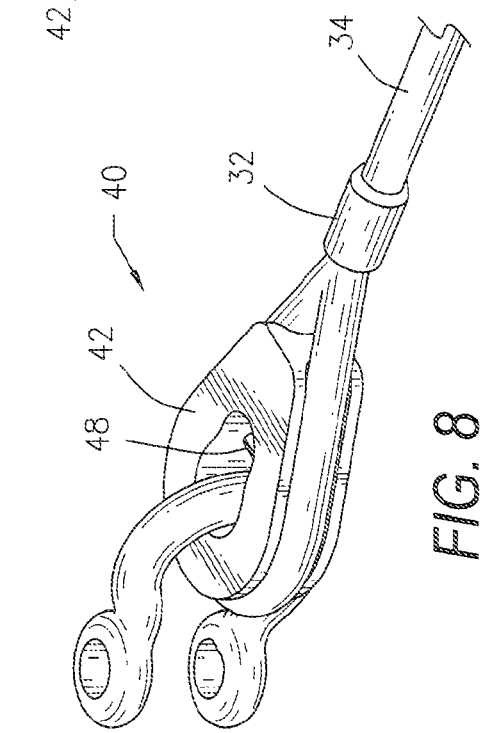

Thereafter, as best seen in FIG. 9, the shackle ends 20 and 22 will be prevented from being removed from the central opening of the thimble body 42 because the pin 48 reduces the size of the central opening. Additionally, the wire rope 34 discourages any movement or removal of the retaining pin 48 in the thimble body.

Figure 11:
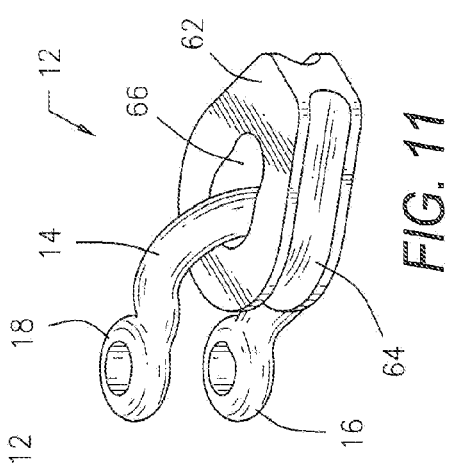
Figure 12:
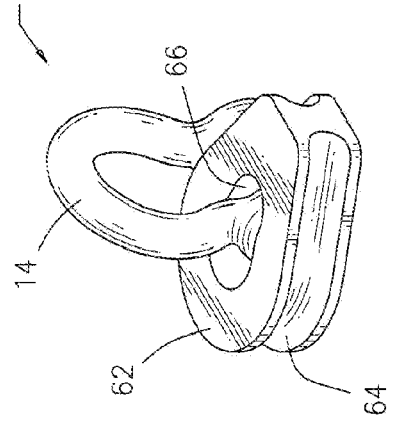
Figure 13:
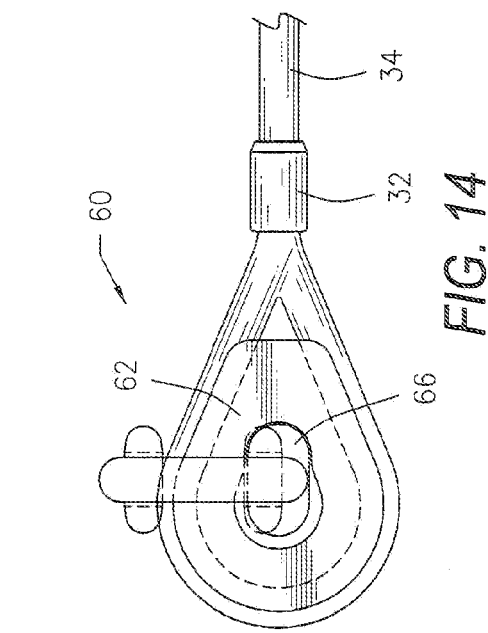

FIGS. 10, 11, 12, 13 and 14 illustrate a third, preferred embodiment 60 of the present invention showing sequential installation of a thimble mechanism for retention of a shackle in wire rope loop termination. As in the previous embodiments, the shackle 12 has a body or bow 14 and a pair of extending legs 16 and 18. Each of the legs 16 and 18 terminates in an ear or end 20 and 22, respectively. Each end 20 and 22 includes an opening to form a pair of opposed, aligned openings for receipt of a shackle bolt (not shown). There is a defined space between the ends 20 and 22 as seen in FIG. 13, and as shown by arrow 68.

Figure 10:
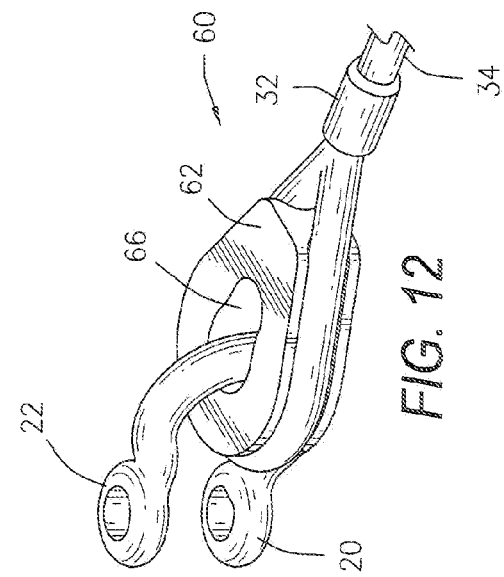
FIGS. 10 through 14 illustrate a third, preferred embodiment of the thimble mechanism for retention of a shackle in a wire loop termination.

A thimble body 62 includes an external arcuate edge with a thimble rope groove 64 recessed therein as best seen in FIGS. 10 and 11. The thimble body 62 also includes a central opening 66 for receipt of the shackle 12.

As seen in FIGS. 10 and 11, in order to install the thimble mechanism 60, one end of the shackle 12 is inserted or reeved through the central opening 66 of the thimble body 62. The shackle 12 may be slipped or inserted into the thimble body 62 without the wire rope installed.

Thereafter, as best seen in FIG. 11, the bow 14 of the shackle 12 will be suspended from the thimble body 62. Thereafter, as best seen in FIG. 12, a cylindrical sleeve 32 will be slipped over or reeved onto an end of a wire rope 34. Thereafter, the wire rope 34 will be reeved or threaded in the thimble rope groove 64 of the thimble body 62 in order to form a termination loop. Finally, the sleeve will be swedged or otherwise connected to the wire rope 34.

Figure 14:
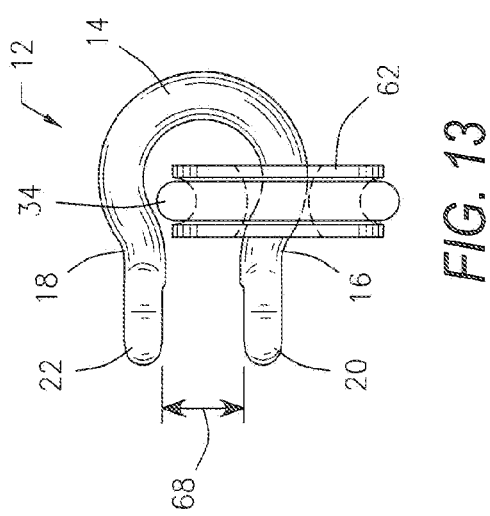

As best seen in FIGS. 13 and 14, once the wire rope has been installed in the rope groove 64, the thimble body 62 and wire rope 34 have a dimension which is larger than the defined space of the opening between the ends 20 and 22 of the legs 16 and 18 of the shackle. Accordingly, the shackle 12 cannot be removed.

Whereas, the present invention has been described in relation to the drawings attached hereto, it should be understood that other and further modifications, apart from those shown or suggested herein, may be made within the spirit and scope of this invention.

What is claimed is:

1. A thimble device for a wire rope loop termination for retention of a shackle having a pair of opposed legs with each of said legs having an end with a width smaller than a depth, which thimble device comprises:

a thimble body having an external arcuate edge with a rope groove in said external arcuate edge for receipt of a wire rope therein;

a central opening through said thimble body, said central opening larger than said width but smaller than said depth of said shackle ends; and a keyway in said thimble body extending through said thimble body from said central opening to said arcuate edge of said thimble body.

2. A method of retention of a shackle in a wire rope loop termination wherein said shackle includes a bow and a pair of opposed legs with each of said legs having an end with a width smaller than a depth, which method comprises:

inserting a bow of said shackle into a central opening of a thimble body by passing through a keyway in said thimble body extending through said thimble body from said central opening to an external arcuate edge of said thimble body;

reeving a wire rope around a rope groove in said external arcuate edge of said thimble body; and forming a wire rope loop termination in order to close said keyway with said wire rope.

\* \* \* \* \*